US008814116B2

(12) United States Patent
Riddiford

(10) Patent No.: US 8,814,116 B2
(45) Date of Patent: Aug. 26, 2014

(54) NAVIGATION ASSEMBLY, A FOLDABLE MOUNT AND A NAVIGATION ASSEMBLY INCLUDING SUCH A MOUNT

(75) Inventor: Martin Riddiford, London (GB)

(73) Assignee: TomTom International B.V., Amsterdam (NL)

(*) Notice: Subject to any disclaimer, the term of this patent is extended or adjusted under 35 U.S.C. 154(b) by 486 days.

(21) Appl. No.: 12/735,321

(22) PCT Filed: Jan. 15, 2009

(86) PCT No.: PCT/EP2009/050414
§ 371 (c)(1),
(2), (4) Date: Jul. 14, 2010

(87) PCT Pub. No.: WO2009/092660
PCT Pub. Date: Jul. 30, 2009

(65) Prior Publication Data
US 2010/0280746 A1 Nov. 4, 2010

Related U.S. Application Data

(60) Provisional application No. 61/006,577, filed on Jan. 22, 2008.

(51) Int. Cl.
G01C 23/00 (2006.01)
G01C 21/00 (2006.01)
B60R 1/02 (2006.01)
A47H 1/10 (2006.01)
A47G 1/10 (2006.01)
B60R 11/02 (2006.01)
B60R 11/00 (2006.01)

(52) U.S. Cl.
CPC ..... *B60R 11/0258* (2013.01); *B60R 2011/0073* (2013.01); *B60R 2011/0071* (2013.01); *B60R 2011/0082* (2013.01); *B60R 2011/0085* (2013.01)
USPC ...... 248/288.31; 701/200; 701/211; 248/481; 248/299.1; 248/316.1

(58) Field of Classification Search
CPC .............. B60R 2011/0071; B60R 2011/0082; B60R 2011/0085; B60R 11/0241; B60R 2011/0073; F16M 13/02; F16M 11/14; F16M 13/022; F16M 13/005; A61M 16/00; A61M 16/16; A61M 16/20; A61M 16/25
USPC ......... 701/200, 299, 211, 208, 491, 468, 205, 701/206, 309, 428, 532, 533, 469, 526, 431, 701/446, 1, 49, 400, 541; D8/363, 355; 381/394, 86, 334; 248/288, 481, 205, 248/309, 206, 187, 284, 415, 160, 176.1, 248/186.1, 187.1, 230.1, 278.1, 288.31, 248/213.2, 299.1, 346.1, 477, 480, 486, 248/539, 339, 316.4; D14/251; 53/381, 53/382, 50; 141/2, 21, 351, 364; 224/929; 379/446, 455; 359/879, 438; 439/34; 382/104, 206.3
See application file for complete search history.

(56) References Cited

U.S. PATENT DOCUMENTS

| | | | | | |
|---|---|---|---|---|---|
| 4,807,425 | A | * | 2/1989 | Abrams | 53/468 |
| 4,836,482 | A | * | 6/1989 | Sokol | 248/206.3 |
| 5,456,294 | A | * | 10/1995 | Tsao et al. | 141/1 |
| 5,604,813 | A | * | 2/1997 | Evans et al. | 381/71.6 |
| 6,663,064 | B1 | * | 12/2003 | Minelli et al. | 248/205.5 |
| 6,902,284 | B2 | * | 6/2005 | Hutzel et al. | 359/865 |
| 6,913,232 | B2 | * | 7/2005 | Richter | 248/205.8 |
| 6,966,533 | B1 | * | 11/2005 | Kalis et al. | 248/316.4 |
| 7,062,378 | B2 | * | 6/2006 | Krull et al. | 701/412 |
| 7,178,771 | B2 | * | 2/2007 | Richter | 248/205.8 |
| 7,184,886 | B1 | * | 2/2007 | Krull et al. | 701/533 |
| D552,970 | S | * | 10/2007 | Brassard | D8/354 |
| 7,296,771 | B2 | * | 11/2007 | Kalis et al. | 248/288.31 |
| 7,334,765 | B2 | | 2/2008 | Hwang | |
| 7,409,288 | B1 | * | 8/2008 | Krull et al. | 701/431 |
| D590,835 | S | * | 4/2009 | Richter | D14/447 |
| 7,516,928 | B2 | * | 4/2009 | Kalis et al. | 248/288.31 |
| 7,828,259 | B2 | * | 11/2010 | Wang et al. | 248/316.4 |
| 8,544,161 | B2 | * | 10/2013 | Carnevali | 29/450 |
| 8,622,359 | B2 | * | 1/2014 | Carnevali | 248/316.1 |

| | | | |
|---|---|---|---|
| 2003/0180088 A1* | 9/2003 | Camevali | 403/56 |
| 2004/0099775 A1* | 5/2004 | Zheng et al. | 248/206.3 |
| 2004/0254722 A1* | 12/2004 | Spencer et al. | 701/208 |
| 2005/0055161 A1* | 3/2005 | Kalis et al. | 701/213 |
| 2005/0087666 A1 | 4/2005 | Hwang | |
| 2005/0096103 A1* | 5/2005 | Eaton et al. | 455/575.1 |
| 2005/0232469 A1* | 10/2005 | Schofield et al. | 382/104 |
| 2006/0089186 A1* | 4/2006 | Richter | 455/575.9 |
| 2006/0139782 A1* | 6/2006 | Weller et al. | 359/879 |
| 2007/0012839 A1* | 1/2007 | Kalis et al. | 248/288.31 |
| 2007/0012840 A1* | 1/2007 | Kalis et al. | 248/288.31 |
| 2007/0016360 A1* | 1/2007 | Lee et al. | 701/200 |
| 2007/0025584 A1* | 2/2007 | Iwata | 381/394 |
| 2007/0080267 A1* | 4/2007 | Richter | 248/160 |
| 2007/0150190 A1* | 6/2007 | Riddiford | 701/213 |
| 2007/0203641 A1* | 8/2007 | Diaz et al. | 701/208 |
| 2008/0023606 A1* | 1/2008 | Kalis et al. | 248/288.31 |
| 2009/0005136 A1* | 1/2009 | Hutzel et al. | 455/575.9 |
| 2009/0127411 A1* | 5/2009 | Aguilar | 248/205.8 |
| 2009/0154078 A1 | 6/2009 | Richter | |
| 2009/0173863 A1* | 7/2009 | Crown | 248/316.4 |
| 2010/0145611 A1 | 6/2010 | Tokue et al. | |
| 2010/0155550 A1* | 6/2010 | Weiss-Vons | 248/206.3 |
| 2010/0181455 A1* | 7/2010 | Ou et al. | 248/316.4 |

FOREIGN PATENT DOCUMENTS

| | | | |
|---|---|---|---|
| DE | 20 2007 005 661 | | 8/2007 |
| DE | 202007005661 | * | 8/2007 |
| DE | 20 2007 007 021 | | 10/2007 |
| DE | 202007007021 | * | 10/2007 |
| EP | 1 652 729 | | 5/2006 |
| EP | 1652729 | * | 5/2006 |
| JP | H08312885 A | | 11/1996 |
| JP | 3039952 U | | 8/1997 |
| JP | 2000333101 A | | 11/2000 |
| JP | 2004217143 A | | 8/2004 |
| JP | 2005-221810 | * | 7/2005 ... 381/394 |
| JP | 2006123901 A | | 5/2006 |
| JP | 2008239100 A | | 10/2008 |
| JP | 2008298765 A | | 12/2008 |
| WO | WO 2008/128586 | * | 10/2008 |

OTHER PUBLICATIONS

Arkon, Freedom Mount Winshield, Aug. 14, 2006, Waybackmachine.*
Amazon.com, Garmin Streetpilot I3 Portable Navigator, Jul. 7, 2004.*
Arkon, VG934 PSP Mount Windshield Suction Pedestal, 2007.*
International Search Report issued Oct. 5, 2009 for International Application No. PCT/EP2009/050414.
International Preliminary Report on Patentability dated Jul. 27, 2010.

* cited by examiner

*Primary Examiner* — Fadey Jabr
*Assistant Examiner* — Luis A Martinez Borrero

(57) ABSTRACT

A portable navigation assembly is disclosed. In at least one embodiment, the portable navigation assembly includes a portable navigation device including a housing, the housing including a speaker port defined by a speaker port periphery; and a mount including a connector arm. In at least one embodiment, the connector arm is adapted to be connected to the portable navigation device around at least a portion of the speaker port periphery without covering at least a portion of the speaker port.

16 Claims, 5 Drawing Sheets

NAVIGATION ASSEMBLY, A FOLDABLE MOUNT AND A NAVIGATION ASSEMBLY INCLUDING SUCH A MOUNT

This is a National Phase of PCT Patent Application No. PCT/EP2009/050414, filed on Jan. 15, 2009, which claims priority under 35 U.S.C. §119 and/or 120 U.S. Provisional Application No. 61/006,577, filed on Jan. 22, 2008, the contents of each of which are hereby incorporated by reference in their entirety.

FIELD OF THE INVENTION

The present invention relates to a navigation assembly. More particularly, but not exclusively, the present invention relates to a navigation assembly including a mount and a portable navigation device, a connector arm of the mount being connected to a portion of the periphery of a speaker port of the portable navigation device. In a further aspect of the invention there is provided a foldable mount. More particularly, but not exclusively, the present invention relates to a foldable mount comprising a connector arm and a mount arm pivotally connected together and adapted to be folded between open and closed configurations. In a further aspect of the invention there is provided a navigation assembly including such a foldable mount.

BACKGROUND TO THE INVENTION

Portable navigation devices (PNDs) that include GPS (Global Positioning System) signal reception and processing functionality are well known and are widely employed as in-car or other vehicle navigation systems.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the 720T model manufactured and supplied by TomTom International B.V., provide a reliable means for enabling users to navigate from one position to another.

When a user is driving between destinations they primarily rely on voice instructions from the PND. When receiving voice instructions the driver has to filter out road noise, engine noise, conversations within the vehicles, the radio etc. Existing PND devices tend to have tiny speakers on the rear face. The is because a significant portion of the rear face is typically used to secure the PND to an arm which is in turn secured to a car windscreen or dashboard. Tiny speakers tend to lack loudness and distort voice output which can make the voice output difficult to hear and/or understand.

The present invention seeks to overcome the problems of the prior art.

SUMMARY OF THE INVENTION

In a first aspect the present invention provides a navigation assembly comprising
- a portable navigation device comprising a housing, the housing comprising a speaker port defined by a speaker port periphery; and,
- a mount comprising a connector arm, the connector arm being adapted to be connected to the portable navigation device around at least a portion of the speaker port periphery without covering at least a portion of the speaker port.

The periphery of the speaker port both defines the speaker port and acts as points of connection for the mount. This enables larger speakers to be included in the PND for the same PND size. As the connector arm does not cover at least a portion of the speaker port this reduces distortion of the emitted voice instructions.

Preferably, the speaker port periphery is inclined to the surrounding housing.

Preferably, the connector arm defines an aperture, the aperture being arranged such that it overlies at least a portion of the speaker port when the connector arm is connected to the speaker port periphery.

The speaker port can comprise an aperture in the housing, the portable navigation device further comprising a speaker within the speaker port.

Alternatively, the speaker port comprises a plurality of apertures defining a mesh, the portable navigation device further comprising a speaker within the housing behind the mesh.

Preferably, the mount further comprises a mount arm for connection to a surface, the mount arm being pivotally connected to the connector arm such that the mount can be folded from an open configuration with the connector arm inclined to the mount arm to a closed configuration with the mount arm adjacent to the connector arm.

The mount arm can be adapted to be at least partially received in the aperture in the connector arm when the mount is in the closed configuration.

In a further aspect of the invention there is provided a foldable mount comprising
- a connector arm for connection to a navigation device; and,
- a mount arm for connecting the mount to a surface,
- the connector arm and the mount arm being pivotally connected together such that the mount can be folded from an open configuration with the connector arm inclined to the mount arm to a closed configuration with the mount arm adjacent to the connector arm.

Preferably, the connector arm comprises an aperture, the mount arm being adapted to be at least partially received in the aperture when the mount is in the closed configuration.

In a further aspect of the invention there is provided a navigation assembly comprising a foldable mount as claimed in either of claim 8 or 9, and, a portable navigation device comprising a housing, the housing comprising a speaker port defined by a speaker port periphery, the connector arm being adapted to be connected to at least a portion of the speaker port periphery.

BRIEF DESCRIPTION OF THE DRAWINGS

The present invention will now be described by way of example only, and not in any limitative sense with reference to the accompanying drawings in which.

DETAILED DESCRIPTION OF PREFERRED EMBODIMENTS

Preferred embodiments of the present invention will now be described with particular reference to a PND. It should be remembered, however, that the teachings of the present invention are not limited to the PNDs described but are instead universally applicable to any type of PND that is configured to execute navigation software so as to provide route planning and navigation functionality. It follows therefore that in the context of the present application, a portable navigation device is intended to include (without limitation) a portable personal computer (PC), mobile telephone or portable digital assistant (PDA)) executing route planning and navigation software.

Figure 1:
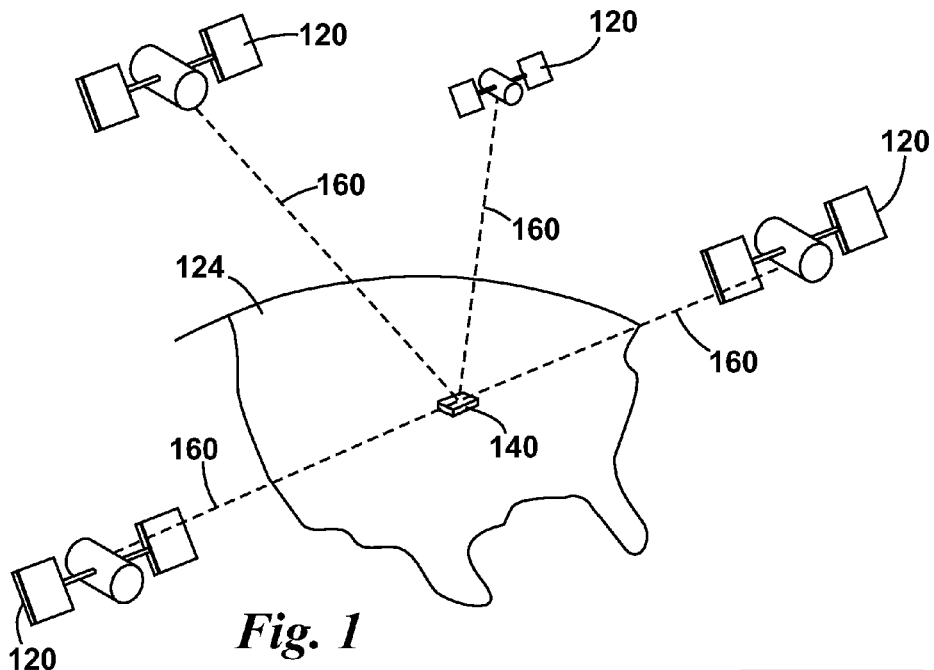
FIG. 1 shows, in schematic form, a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
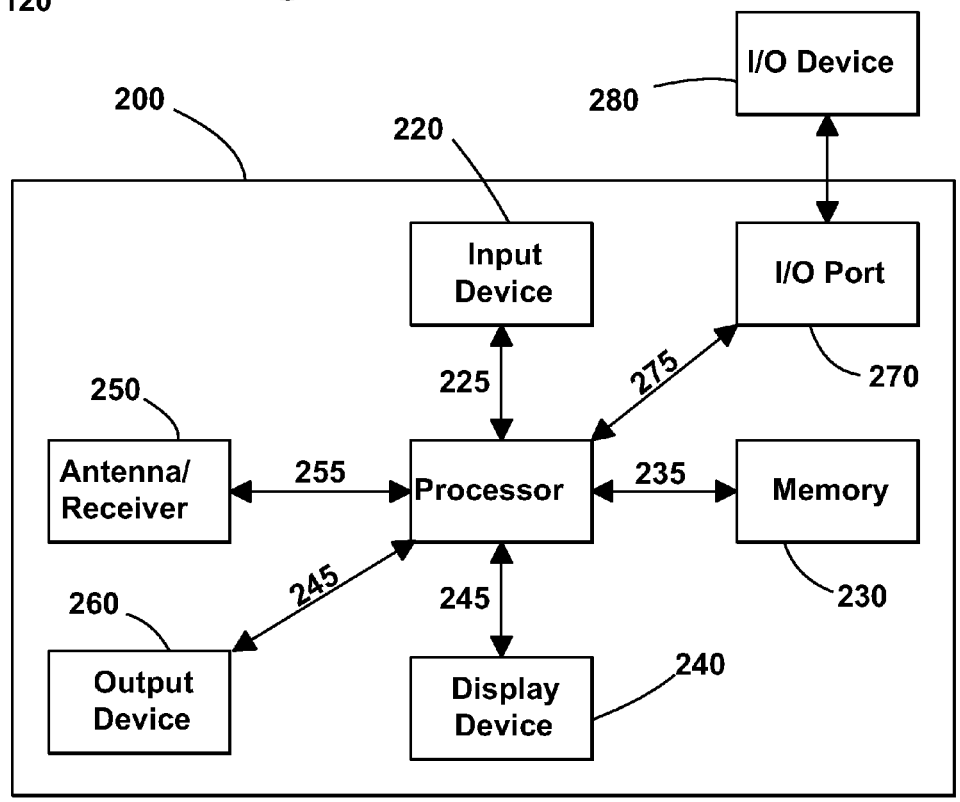
FIG. 2 shows, in schematic form a known portable navigation device (PND)

FIG. 2 is an illustrative representation of electronic components of a known portable navigation device 200 in block component format. It should be noted that the block diagram of the portable navigation device 200 is not inclusive of all components of the portable navigation device, but is only representative of many example components.

The portable navigation device 200 comprises a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The portable navigation device may include an output device 260, for example an audible output device (e.g. a loudspeaker). As output device 260 can produce audible information for a user of the portable navigation device 200, it is should equally be understood that input device 240 can include a microphone and software for receiving input voice commands as well.

In the portable navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectable to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an ear piece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the portable navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are possible. For example, the components shown in FIG. 2 may be in communication with one another via wired and/or wireless connections and the like.

Figure 3:
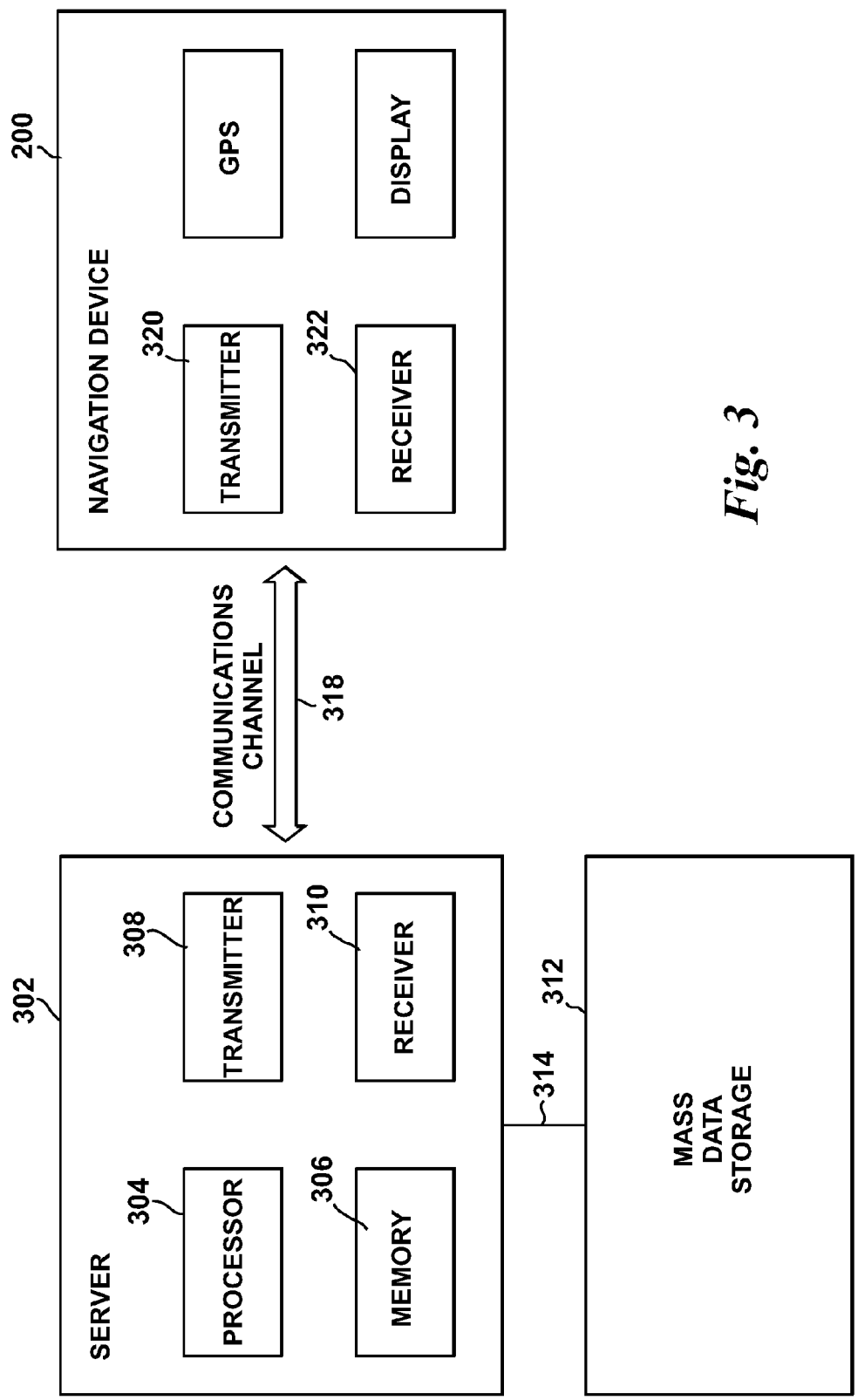
FIG. 3 shows, in schematic form, the manner in which a further portable navigation device may receive information over a wireless communication channel.

Referring now to FIG. 3, the portable navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the portable navigation device 200 and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The portable navigation device 200 can further complete a data connection with the mobile device, and eventually with the Internet and server 302, via existing Bluetooth technology for example, in a known manner, wherein the data protocol can utilize any number of standards, such as the GSRM, the Data Protocol Standard for the GSM standard, for example.

The portable navigation device 200 may include its own mobile phone technology within the portable navigation device 200 itself (including an antenna for example, or optionally using the internal antenna of the portable navigation device 200). The mobile phone technology within the portable navigation device 200 can include internal components as specified above, and/or can include an insertable card (e.g. Subscriber Identity Module or SIM card), complete with necessary mobile phone technology and/or an antenna for example. As such, mobile phone technology within the portable navigation device 200 can similarly establish a network connection between the portable navigation device 200 and the server 302, via the internet for example, in a manner similar to that of any mobile device.

For GRPS phone settings, a Bluetooth enabled portable navigation device may be used to correctly work with the ever changing spectrum of mobile phone models, manufacturers, etc., model/manufacturer specific settings may be stored on the portable navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a portable navigation device 200 can communicate when a connection via communications channel 318 is established between the server 302 and the portable navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from portable navigation device 200 via communications channel 318. The signals sent and received may include data, communication, and/or other propagated signals. The transmitter 308 and receiver 310 may be selected or designed according to the communications requirement and communication technology used in the communication design for the portable navigation device 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The portable navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the portable navigation device 200 and the functions of the transmitter 320 and receiver 322 may be combined into a single transceiver.

Software stored in server memory 306 provides instructions for the processor 304 and allows the server 302 to provide services to the portable navigation device 200. One service provided by the server 302 involves processing requests from the portable navigation device 200 and transmitting navigation data from the mass data storage 312 to the portable navigation device 200. Another service provided by the server 302 includes processing the navigation data using various algorithms for a desired application and sending the results of these calculations to the portable navigation device 200.

The communication channel 318 generically represents the propagating medium or path that connects the portable navigation device 200 and the server 302. Both the server 302 and portable navigation device 200 include a transmitter for transmitting data through the communication channel and a receiver for receiving data that has been transmitted through the communication channel.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the portable navigation device 200. Alternatively, a personal computer may be connected between the portable navigation device 200 and the server 302 to establish an internet connection between the server 302 and the portable navigation device 200. Alternatively, a mobile telephone or other handheld device may establish a wireless connection to the internet, for connecting the portable navigation device 200 to the server 302 via the internet.

The portable navigation device 200 may be provided with information from the server 302 via information downloads which may be periodically updated automatically or upon a user connecting portable navigation device 200 to the server 302 and/or may be more dynamic upon a more constant or frequent connection being made between the server 302 and portable navigation device 200 via a wireless mobile connection device and TCP/IP connection for example. For many dynamic calculations, the processor 304 in the server 302 may be used to handle the bulk of the processing needs, however, processor 210 of portable navigation device 200 can also handle much processing and calculation, oftentimes independent of a connection to a server 302.

As indicated above in FIG. 2, a portable navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the portable navigation device 200 can also include any additional input device 220 and/or any additional output device 241, such as audio input/output devices for example.

Figure 4:
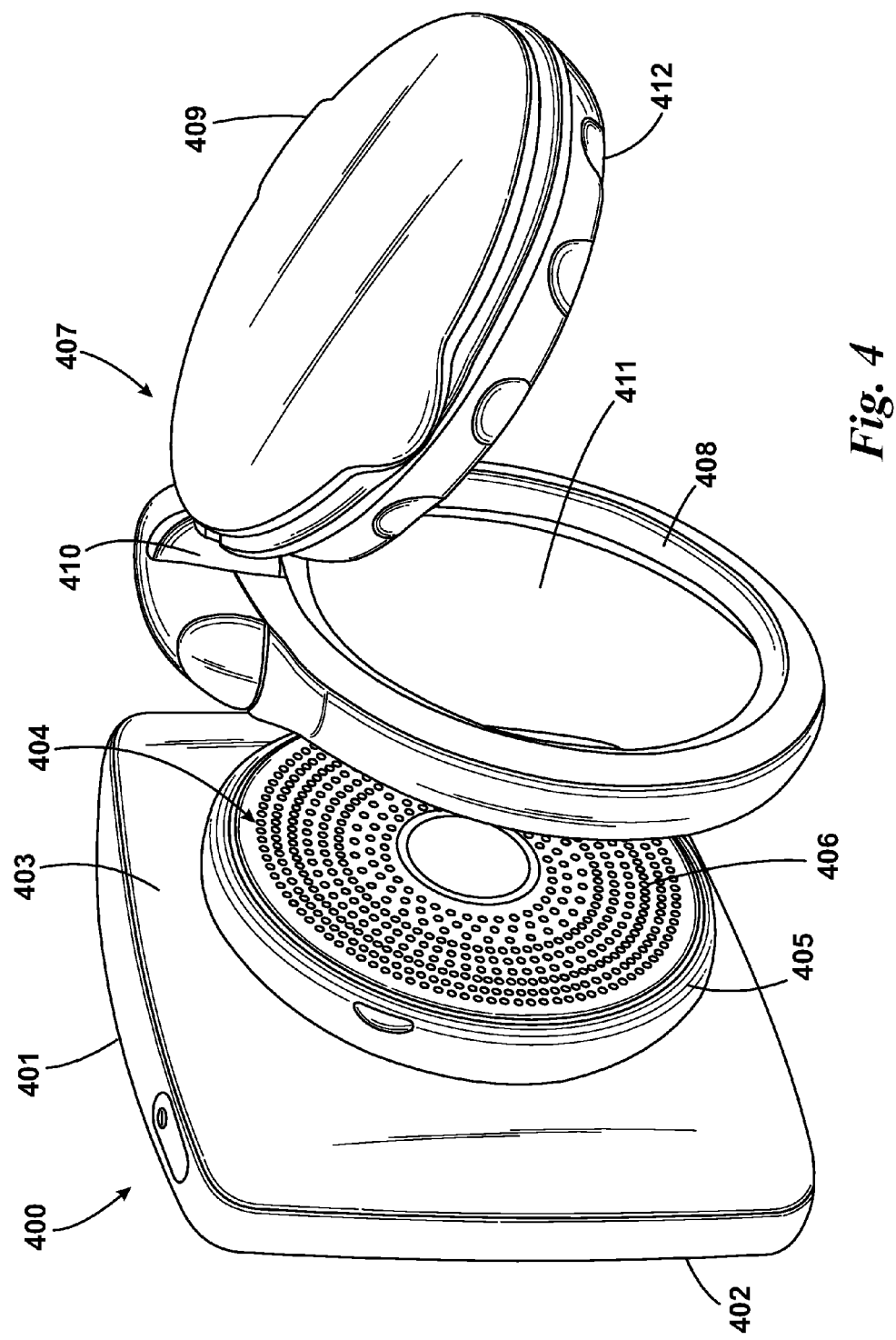
FIG. 4 shows a navigation assembly according to the invention in exploded view.

Shown in FIG. 4 is a navigation assembly 400 according to the invention. The navigation assembly 400 comprises a portable navigation device 401 which may for example be a PND as described with reference to either of FIG. 2 or 3. The portable navigation device 401 comprises a housing 402. A portion of the rear face 403 of the housing comprises a speaker port periphery 404 which defines a speaker port 405 as shown. The speaker port periphery 404 is inclined to the adjacent portion of the housing 402 as shown. Arranged within the speaker port 405 is a speaker 406.

The navigation assembly 400 further comprises a foldable mount 407. The foldable mount 407 comprises a connector arm 408 and a mount arm 409. The two arms 408, 409 are pivotally connected together at a pivot point 410. The mount 407 may be folded between open and closed configurations by pivoting the connector arm 408 about the pivot point 410 with respect to the mount arm 407.

Figure 5:
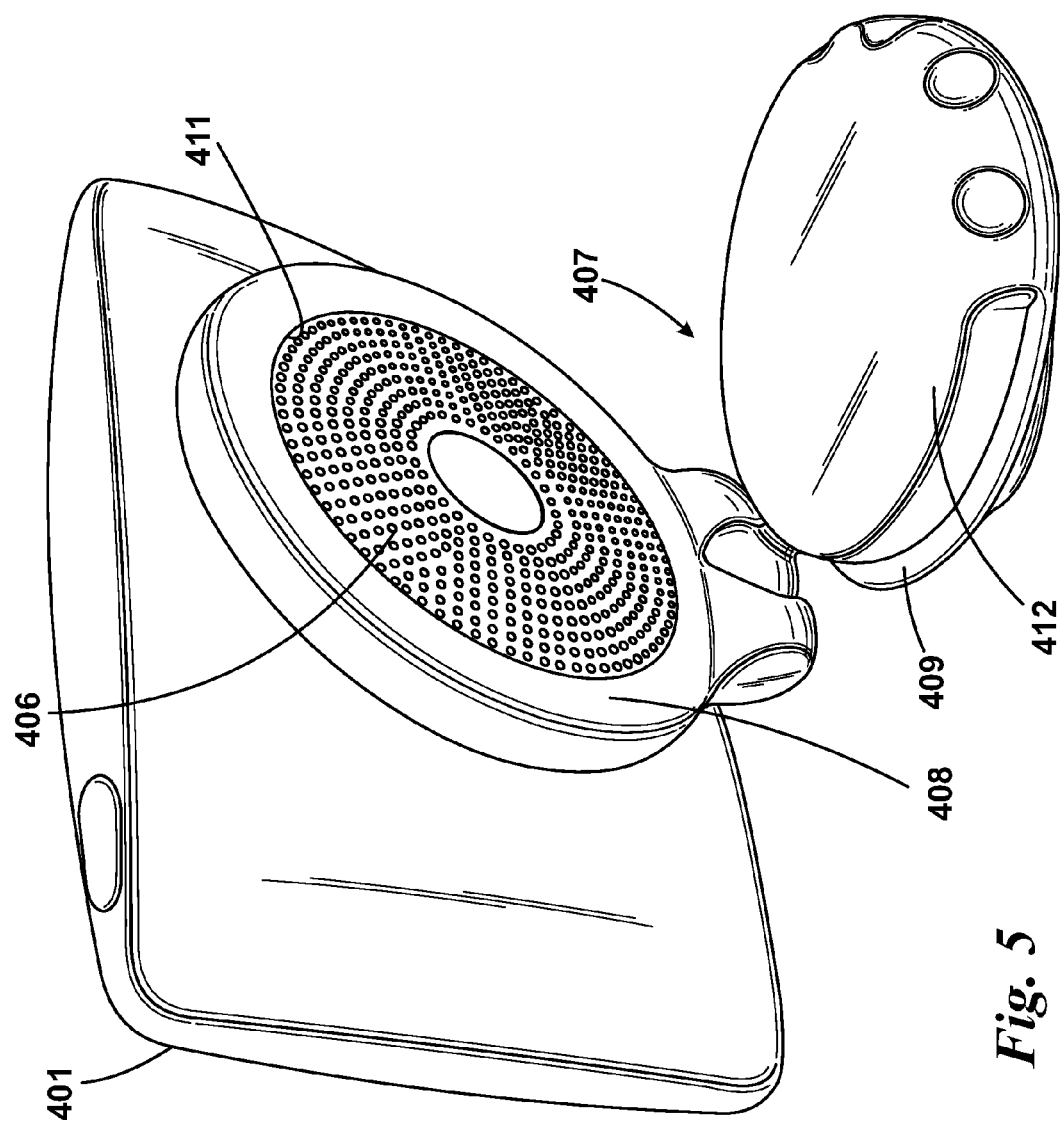
FIG. 5 shows a navigation assembly according to the invention with the mount in an open configuration; and, FIG. 6 shows the navigation assembly of FIG. 5 with the mount in the closed configuration.

Shown in FIG. 5 is the mount 407 in the open configuration with the connector arm 408 inclined to the mount arm 409. The connector arm 408 is shown attached to the speaker port periphery 404. In this embodiment the connector arm 408 is snap fit into engagement with the speaker port periphery 404. The connector arm 408 may be released by sharply pulling the connector arm 408 and portable navigation device 401 apart.

An aperture 411 extends through the connector arm 408. The aperture 411 is arranged such that when the connector arm 408 is connected to the speaker port periphery 404 the aperture 411 overlies the speaker port 405 as shown. Sound generated by the speaker 406 within the speaker port 405 is therefore not distorted by the connector arm 408.

The mount arm 409 comprises a mount arm connector 412 for connecting the mount 407 to a surface such as a windscreen or dashboard. In this embodiment the mount arm connector 412 comprises an elastomeric disc and a camming mechanism which draws the centre of the disc upwards to create a vacuum between the disc and the surface to which it is affixed.

Figure 6:
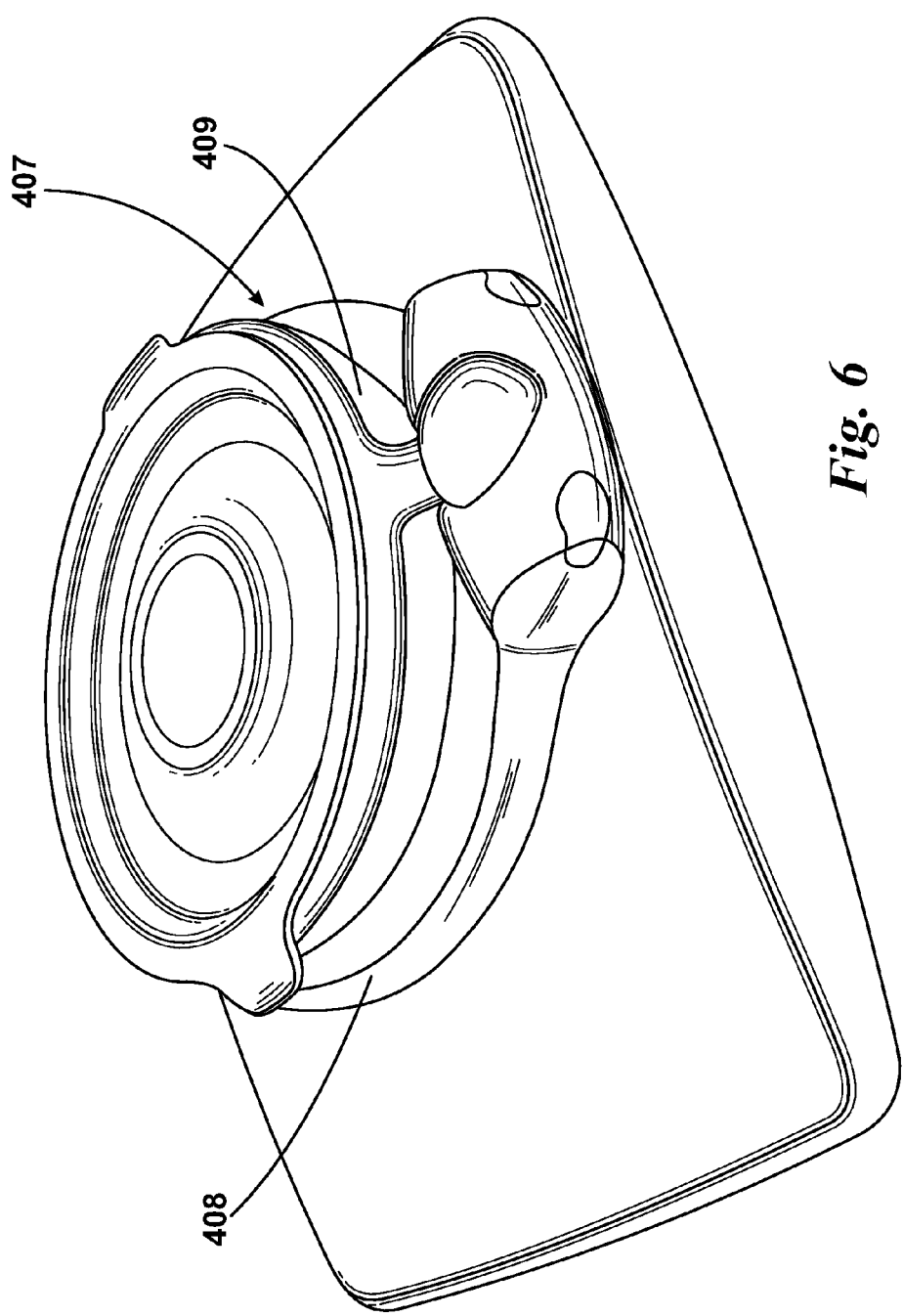

Shown in FIG. 6 is the foldable mount 407 in the closed configuration with the mount arm 409 adjacent to the connector arm 408. The connector arm 408 and mount arm 409 are designed such that when in the closed configuration the mount arm 409 fits partially within the aperture 411 in the connector arm 408 as shown so reducing the thickness of the mount 407.

When not in use the navigation assembly 400 is typically stored as shown in FIG. 6 with the portable navigation device 401 connected to the connector arm 408 of the mount 407, the mount 407 being folded in the closed configuration. In this configuration the navigation assembly 400 is sufficiently compact that it can easily be stored in a pocket or briefcase if required. When it is desired to use the navigation assembly 400 the mount 407 is unfolded to the open configuration. The elastomeric disc is pushed against a surface and the camming mechanism then rotated, deforming the disk and fixing the mount 407 in place. When the user has finished using the navigation assembly 400 the camming mechanism is rotated in the opposite direction freeing the elastomeric disk from the surface to which it is attached. The mount 407 is then folded back to the closed configuration.

In the above embodiment the connector arm 408 snap fits into engagement with the speaker port periphery 404. In alternative embodiments of the invention other types of connection to the speaker port periphery 404 are possible. For example the connector arm 408 and PND 401 may be screwed together by means of corresponding threads on the connector arm 408 and speaker port periphery 404. In an alternative embodiment there may be a simple interference fit between connector arm 408 and speaker port periphery 404.

In an alternative embodiment of the invention the mount arm 409 comprises a simple elastomeric disk which is pushed into contact with a surface.

In the embodiment described with reference to FIG. 5 the speaker port 405 is an aperture in the housing 402 of the portable navigation device 401. In an alternative embodiment the speaker port 405 comprises a plurality of apertures defining a mesh. In this embodiment a speaker 406 is contained within the PND 401 behind the mesh.

In an alternative embodiment of the invention the connector arm 408 extends only a portion of the way around the periphery of the speaker port 405. If the speaker port 405 is circular then the connector arm 408 has a uniform curvature. If the speaker port 405 is other than circular, for example oval, square or oblong then the curvature of the connector arm 408 varies along its length to match a portion of the periphery of the speaker port 405. In each case the connector arm 408 is dimensioned such that when it is connected to the speaker port periphery 404 at least a portion of the speaker port 405 is not covered by the connector arm 408.

The invention claimed is:

1. A navigation assembly comprising:
a portable navigation device comprising a housing, the housing comprising a speaker port defined by a speaker port periphery; and
a mount comprising a connector arm, the connector arm being adapted to be connected to the portable navigation device
wherein the connection between the connector arm and the navigation device is achieved by means of the connector arm being of a shape which engages with, at least a portion of the speaker port periphery so as to be at least partially peripheral to the speaker port and such that at least a portion of said speaker port remains uncovered thereby.

2. A navigation assembly as claimed in claim 1, wherein the speaker port periphery is inclined to the surrounding housing.

3. A navigation assembly as claimed in claim 2, wherein the connector arm defines an aperture, the aperture being arranged such that it overlies at least a portion of the speaker port when the connector arm is connected to the speaker port periphery.

4. A navigation assembly as claimed in claim 2, wherein the speaker port comprises an aperture in the housing, the portable navigation device further comprising a speaker within the speaker port.

5. A navigation assembly as claimed in claim 2, wherein the speaker port comprises a plurality of apertures defining a mesh, the portable navigation device further comprising a speaker within the housing behind the mesh.

6. A navigation assembly as claimed in claim 2, wherein the mount further comprises a mount arm for connection to a surface, the mount arm being pivotally connected to the connector arm such that the mount can be folded from an open configuration with the connector arm inclined to the mount arm to a closed configuration with the mount arm adjacent to the connector arm by pivoting the connector arm about a pivot point with respect to the mount arm; wherein the connector arm comprises an aperture and the mount arm is adapted to be at least partially received in the aperture when the mount is in the closed configuration.

7. A navigation assembly as claimed in claim 1, wherein the connector arm defines an aperture, the aperture being arranged such that it overlies at least a portion of the speaker port when the connector arm is connected to the speaker port periphery.

8. A navigation assembly as claimed in claim 7, wherein the mount further comprises a mount arm for connection to a surface, the mount arm being pivotally connected to the connector arm such that the mount can be folded from an open configuration with the connector arm inclined to the mount arm to a closed configuration with the mount arm adjacent to the connector arm.

9. A navigation assembly as claimed in claim 8, wherein the mount arm is adapted to be at least partially received in the aperture in the connector arm when the mount is in the closed configuration.

10. A navigation assembly as claimed in claim 7, wherein the speaker port comprises an aperture in the housing, the portable navigation device further comprising a speaker within the speaker port.

11. A navigation assembly as claimed in claim 7, wherein the speaker port comprises a plurality of apertures defining a mesh, the portable navigation device further comprising a speaker within the housing behind the mesh.

12. A navigation assembly as claimed in claim 1, wherein the speaker port comprises an aperture in the housing, the portable navigation device further comprising a speaker within the speaker port.

13. A navigation assembly as claimed in claim 1, wherein the speaker port comprises a plurality of apertures defining a mesh, the portable navigation device further comprising a speaker within the housing behind the mesh.

14. A navigation assembly as claimed in claim 1, wherein the mount further comprises a mount arm for connection to a surface, the mount arm being pivotally connected to the connector arm such that the mount can be folded from an open configuration with the connector arm inclined to the mount arm to a closed configuration with the mount arm adjacent to the connector arm by pivoting the connector arm about a pivot point with respect to the mount arm; wherein the connector arm comprises an aperture and the mount arm is adapted to be at least partially received in the aperture when the mount is in the closed configuration.

15. A foldable mount comprising:
a connector arm for connection to a portable navigation device; and
a mount arm for connecting the mount to a surface,
the connector arm and the mount arm being pivotally connected together such that the mount can be folded from an open configuration with the connector arm inclined to the mount arm to a closed configuration with the mount arm adjacent to the connector arm, by pivoting the connector arm about a pivot point with respect to the mount arm,
wherein the connector arm comprises an aperture and the mount arm is adapted to be at least partially received in the aperture when the mount is in the closed configuration, wherein the connector arm is of a shape which is arranged to engage with at least a portion of a periphery of a speaker port of the portable navigation device so as to be at least partially peripheral to the speaker port and such that at least a portion of said speaker port remains uncovered thereby.

16. A navigation assembly comprising
a foldable mount as claimed in claim 15, and
a portable navigation device comprising a housing, the housing comprising a speaker port defined by a speaker port periphery, the connector arm being adapted to be connected to at least a portion of the speaker port periphery.

* * * * *